US009322429B2

(12) United States Patent
Bauck et al.

(10) Patent No.: US 9,322,429 B2
(45) Date of Patent: Apr. 26, 2016

(54) HIGH PRESSURE INLET SWIVEL FOR HOSE REEL

(71) Applicant: Graco Minnesota Inc., Minneapolis, MN (US)

(72) Inventors: Mark L. Bauck, Coon Rapids, MN (US); Michael E. Bloom, Anoka, MN (US); Daniel L. Medina, St. Paul, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 0 days.

(21) Appl. No.: 14/759,150

(22) PCT Filed: Jan. 3, 2014

(86) PCT No.: PCT/US2014/010168
§ 371 (c)(1),
(2) Date: Jul. 2, 2015

(87) PCT Pub. No.: WO2014/107568
PCT Pub. Date: Jul. 10, 2014

(65) Prior Publication Data
US 2015/0337895 A1    Nov. 26, 2015

Related U.S. Application Data

(60) Provisional application No. 61/748,485, filed on Jan. 3, 2013.

(51) Int. Cl.
*F16L 27/08* (2006.01)
*F16C 19/16* (2006.01)
(Continued)

(52) U.S. Cl.
CPC ............ *F16C 19/16* (2013.01); *B65H 75/4478* (2013.01); *F16C 19/163* (2013.01);
(Continued)

(58) Field of Classification Search
CPC ...... F16C 19/16; F16C 19/163; F16C 33/583; F16C 33/585; B65H 75/4478; F16L 27/0824; F16L 27/0828; F16L 27/0832
See application file for complete search history.

(56) References Cited

U.S. PATENT DOCUMENTS 689,643 A * 12/1901 Gibbs ................. F16L 27/0832
285/272
1,810,093 A * 6/1931 Timson .................. G01G 21/06
384/539

(Continued)

FOREIGN PATENT DOCUMENTS

JP         2004293772 A    10/2004

OTHER PUBLICATIONS

International Search Report and Written Opinion from PCT Application Serial No. PCT/US2014/010168, dated Apr. 28, 2014, 11 pages.

*Primary Examiner* — Kevin Murphy
(74) *Attorney, Agent, or Firm* — Kinney & Lange, P.A.

(57) ABSTRACT

A hose reel bearing arrangement supports a rotatable swivel shaft on a stationary hose reel frame. The bearing arrangement comprises a stationary bearing race, a rotating bearing race and a bearing. The stationary bearing race is anchored to the stationary hose reel frame, and has a stationary arcuate land for bearing an axial load, a stationary cylindrical land for bearing a radial load, and a stationary frustoconical intervening portion. The rotating bearing race is anchored to the rotatable swivel shaft, and has a rotating arcuate land for bearing the axial load, a rotating cylindrical land for bearing the radial load, and a rotating frustoconical intervening portion. The bearing is bracketed axially by the stationary arcuate land and the rotating arcuate land, and radially by the stationary cylindrical land and the rotating cylindrical land.

20 Claims, 4 Drawing Sheets

(51) Int. Cl.
*F16L 43/00* (2006.01)
*F16C 33/58* (2006.01)
*B65H 75/44* (2006.01)

(52) U.S. Cl.
CPC ............. *F16C33/583* (2013.01); *F16C 33/585* (2013.01); *F16L 27/0824* (2013.01); *F16L 27/0828* (2013.01); *F16L 27/0845* (2013.01); *F16L 43/00* (2013.01); *B65H 2701/33* (2013.01); *Y10T 137/6954* (2015.04)

(56) References Cited

U.S. PATENT DOCUMENTS

| | | | |
|---|---|---|---|
| 2,219,201 A | 10/1940 | Smith | |
| 2,279,156 A | 4/1942 | Barks et al. | |
| 2,496,471 A | 2/1950 | Hornbostel | |
| 2,629,630 A | 2/1953 | Roark | |
| 2,659,546 A | 11/1953 | Rotter et al. | |
| 2,704,230 A * | 3/1955 | Roschlau | F16C 21/00 29/898.061 |
| 2,717,166 A | 9/1955 | Hedden | |
| 2,769,575 A | 11/1956 | Harman et al. | |
| 3,523,550 A | 8/1970 | Richardson | |
| 3,528,621 A | 9/1970 | Lyle | |
| 3,986,754 A * | 10/1976 | Torrant | F16C 19/183 29/898.063 |
| 4,089,570 A * | 5/1978 | Markfelder | F16C 19/163 384/510 |
| 4,276,974 A | 7/1981 | Ladin | |
| 4,606,560 A | 8/1986 | McCracken | |
| 4,676,267 A * | 6/1987 | Bloch | B65H 75/4478 137/355.26 |
| 5,098,135 A | 3/1992 | Timm | |
| 6,637,454 B1 | 10/2003 | Eley | |
| 2003/0047944 A1 | 3/2003 | Ungchusri et al. | |
| 2012/0037245 A1 | 2/2012 | Eley et al. | |

\* cited by examiner

HIGH PRESSURE INLET SWIVEL FOR HOSE REEL

BACKGROUND

The present invention relates generally to inlet swivels for hose reels. More particularly, the present invention relates to bearing arrangements for swivels capable of transmitting high-pressure fluids while also minimizing pressure drop.

Hose reels are commonly used in fluid handling industries, such as for the dispensing of pressurized air, lubricants, adhesives and the like. In these and other applications, bulk quantities of the pressurized fluid are distributed in much smaller volumes using a dispenser that is separated from a storage vessel via a hose. Lengthy hoses are used to facilitate wide ranging of the dispenser to many different distribution points. Hose reels are used to conveniently wind and un-wind the hose, thereby reducing the potential for damaging the hose or people tripping over the hose.

Typical hose reels utilize a swivel that is positioned at the axis of rotation of the reel. An inlet end of the swivel receives fluid from the bulk container, and delivers the fluid to a stationary frame of the hose reel assembly. A rotating end of the swivel receives fluid from the inlet end, and allows the hose to rotate with a drum of the hose reel assembly. The swivel is subject to axial loading from pressurized fluid flowing through the swivel and radial loading from the weight of the drum and hose. In order to withstand or eliminate the axial loading, typical high-pressure swivel couplings utilize a "balanced seal" design. In a typical balanced seal design, a non-rotating post having transfer holes, or perforations, can be joined to a sleeve that rotates about the post, forming a fluid path from the inside of the post, through the perforations and into the sleeve. Such a swivel is described in U.S. Pat. No. 5,052,432. The transfer holes, however, introduce a constriction into the fluid passage that generates an undesirable pressure drop and that also result in stress concentrations that limit the pressure rating of the swivel.

SUMMARY

A hose reel bearing arrangement supports a rotatable swivel shaft on a stationary hose reel frame. The bearing arrangement comprises a stationary bearing race, a rotating bearing race and a bearing. The stationary bearing race is anchored to the stationary hose reel frame, and has a stationary arcuate land for bearing an axial load, a stationary cylindrical land for bearing a radial load, and a stationary frustoconical intervening portion. The rotating bearing race is anchored to the rotatable swivel shaft, and has a rotating arcuate land for bearing the axial load, a rotating cylindrical land for bearing the radial load, and a rotating frustoconical intervening portion. The bearing is bracketed axially by the stationary arcuate land and the rotating arcuate land, and radially by the stationary cylindrical land and the rotating cylindrical land.

DETAILED DESCRIPTION

Figure 1:
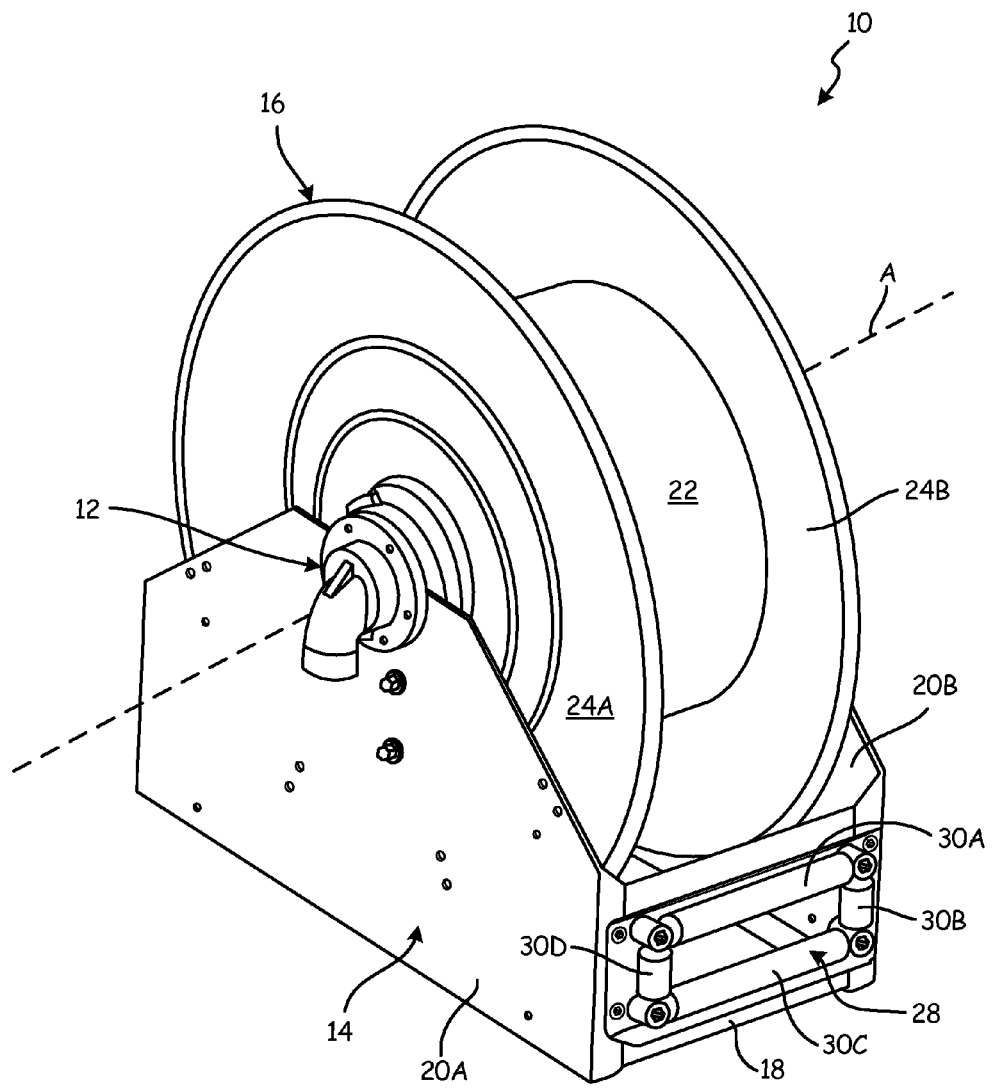
FIG. 1 is a perspective view of a hose reel having a high pressure swivel connecting a frame to a spool.

FIG. 1 is a perspective view of hose reel 10 having high pressure swivel 12 connecting frame 14 to spool 16. Frame 14 includes base 18 to which are connected sidewalls 20A and 20B. Spool 16 includes drum 22 and disks 24A and 24B. Swivel 12 includes a bearing structure that rotatably couples sidewall 20A with disk 24A. A similar bearing structure (bearing 26 of FIG. 2) rotatably couples sidewall 20B with disk 24B. However, swivel 12 provides a fluid coupling between the exterior of frame 14 and the interior of spool 16 so that a hose can be wound around drum 22.

Frame 14 provides a mounting structure upon which spool 16 can be rotated. Thus, frame 14 remains stationary as hose reel 10 is operated. Spool 16 rotates on swivel 12 and bearing 26, which extend through the axis of rotation of drum 22, axis A. As spool 16 rotates, a hose can be wound or un-wound from drum 22. A hose (or tubing, conduit or the like) may be wound around drum 22 through window 28, which is lined by rollers 30A-30D to prevent damage to the hose. Swivel 12 allows unrestricted flow of high pressure fluid through swivel 12 to minimize pressure drop. Swivel 12 also includes a bearing that provides sufficient axial strength to counter the load generated by high pressure fluid within swivel 12, and radial strength to bear the weight of spool 16 and the hose.

Figure 2:
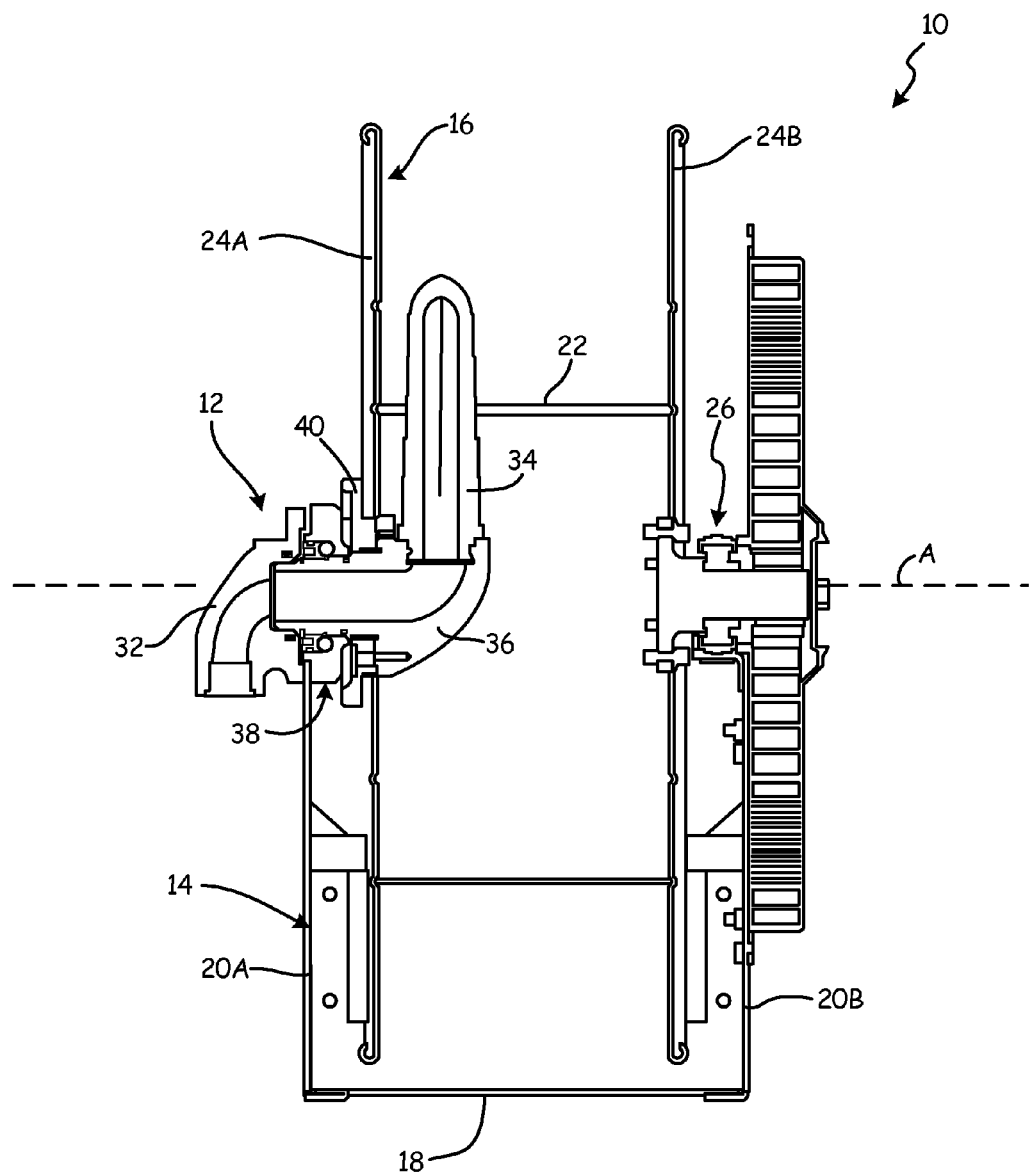
FIG. 2 is a cross-sectional view of the hose reel of FIG. 1 showing a high pressure swivel having an inlet housing and an outlet housing connected by a swivel shaft.

FIG. 2 is a cross-sectional view of hose reel 10 of FIG. 1 showing high pressure swivel 12 having inlet housing 32 and outlet housing 34 connected by swivel shaft 36. Swivel 12 also includes retainer 38 and hub 40. Spool 16 and outlet housing 34 are configured to rotate about axis A, while inlet housing 32 and frame 14 remain stationary.

Inlet housing 32 and retainer 38 are connected to each other via fasteners (not shown) such that sidewall 20A is clamped in between. Thus, inlet housing 32, retainer 38 and all of frame 14 remain stationary during operation of hose reel 10. Inlet housing 32 may be positioned in different circumferential orientations about axis A with respect to frame 14 to accommodate different supply hose positions.

Swivel shaft 36 is positioned along axis A and is configured to rotate with spool 16. Swivel shaft 36 extends through an opening in disk 24A and an opening in hub 40. Disk 24A is clamped in between swivel shaft 36 and hub 40. As such, hub 40 and swivel shaft 36 rotatable about axis A with spool 16. Swivel shaft 36 is inserted through retainer 38 and into inlet housing 32. Outlet housing 34 is also connected to swivel shaft 36 within drum 22. Outlet housing 34 extends through an opening in drum 22.

Inlet housing 32, swivel shaft 36 and outlet housing 34 include interior flow passages through which fluid may flow, as is discussed with reference to FIG. 3. Thus, a supply hose can be connected to inlet housing 32 to provide high pressure fluid to outlet housing 34, which can be connected to a distribution hose wound around drum 22 between disks 24A and 24B. Union fittings may be used to join hoses to inlet housing 32 and outlet housing 34. Alternatively, a hose may be directly coupled to swivel shaft 36 without the use of outlet housing 34.

As will be discussed in greater detail with reference to FIGS. 3 and 4, retainer 38 includes ball bearings situated between a stationary race and a rotating race that permit swivel shaft 36 to rotate within retainer 38 and inlet housing 32. Swivel shaft 36 includes a non-restricted fluid passage through swivel 12 that allows for coupling to inlet housing 32 and outlet housing 34 without producing a pressure drop. In order to accommodate swivel shaft 36 within swivel 12 and to allow the fluid passage within swivel shaft 36 to pass through retainer 38, hub 40, disk 24A without producing a restriction, retainer 38 includes ball bearing races that counteract the axial and radial forces generated by operation of hose reel 10 and the high pressure fluid flowing between inlet housing 32 and outlet housing 34.

Figure 3:
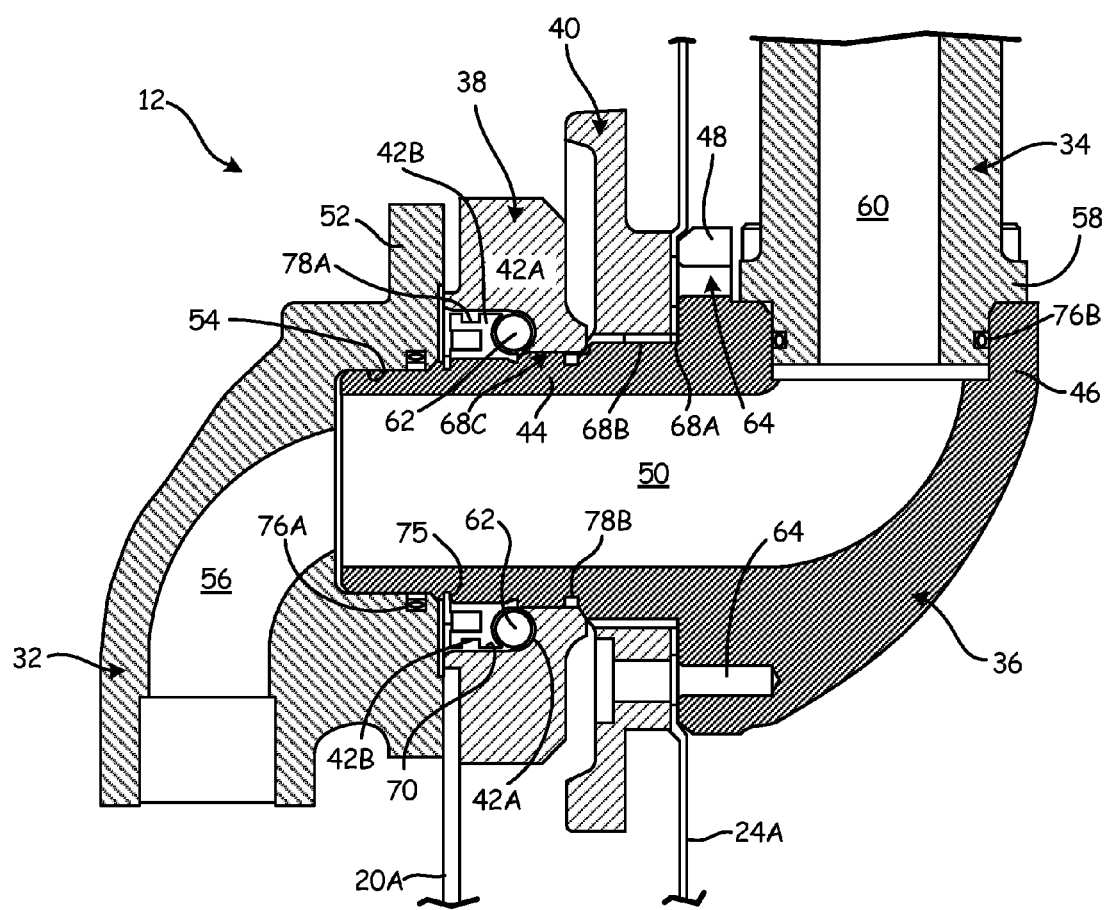
FIG. 3 is a close-up cross-sectional view of the hose reel swivel of FIG. 2 showing inner and outer bearing races surrounding the swivel shaft.

FIG. 3 is a close-up cross-sectional view of hose reel swivel 12 of FIG. 2 showing inner and outer bearing races 42A and 42B surrounding swivel shaft 36. Swivel shaft 36 includes shaft 44, outlet socket 46, flange 48 and fluid passage 50. Inlet housing 32 includes flange 52, socket 54 and fluid passage 56. Outlet housing 34 includes flange 58 and fluid passage 60. Ball bearings 62 are positioned between the stationary outer race 42A and the rotating inner race 42B. Although outer race 42A is shown integrally formed from retainer 38, outer race 42A may be provided by a separate piece positioned within a pocket inside retainer 38.

As discussed above, inlet housing 32 is joined to retainer 38 to mount hose reel swivel 12 to sidewall 20A. In particular, flange 52 is connected to outer race 42A via fasteners (not shown). Thus, outer race 42A and inlet housing 32 are held stationary via mounting to frame 14 via sidewall 20A. Hub 40 is joined to swivel shaft 36 to mount outlet housing 34 to disk 24A. In particular, hub 40 is connected to outlet socket 46 of swivel shaft 36 via fasteners (not shown) at locations 64. Shaft 44 of swivel shaft 36 extends from outlet socket 46 to pass through bore 68A in disk 24A, bore 68B in hub 40 and bore 68C in retainer 38, and into socket 54. Thus, shaft 44 and inner race 42B rotate along with disk 24A of spool 16. Ball bearings 62 roll between outer race 42A and inner race 42B.

Outlet housing 34 is inserted into outlet socket 46 within swivel shaft 36 until flange 58 engages outlet socket 46. Inner race 42B is mounted on shaft 44 within channel 70 of outer race 42A, and is retained by threaded connection and secured by split ring 75. Inner race 42B is thus rotatable with swivel shaft 36, while outer race 42A is held in place via sidewall 20A. Connected as such, fluid passages 56, 50 and 60 are fluidly connected. Fluid passage 50 extends from flange 52, through retainer 38 and hub 40 and into outlet socket 46 in a linear fashion, thereby eliminating any constrictions between fluid passages 56 and 60.

Swivel 12 is provided with a variety of different seals, including fluid seals 76A and 76B and bearing seals 78A and 78B. In the depicted embodiment, fluid seal 76A comprises an inner plastic sealing member and an outer elastomeric o-ring. However, fluid seal 76A may comprise other off-the-shelf seals, such as o-rings, lip seals and the like. In the depicted embodiment, fluid seal 76B and bearing seals 78A and 78B comprise o-ring seals, but may be other types of seals. Bearing seals 78A and 78B protect ball bearings 62 and races 42A and 42B from environmental elements, and may also be used to retain lubricant, such as grease, within races 42A and 42B. Fluid seals 76A and 76B prevent fluid traveling through fluid passages 50, 56 and 60 from leaking out of swivel 12.

Due to the load generated by pressure and large cross-sectional flow areas through fluid passages 50, 56 and 60, the axial loading within swivel 12 is greater than conventional hose reel swivels. Inner race 42A and outer race 42B are shaped to provide contact surfaces along ball bearings 62 that provide radial and axial support to swivel 12.

Figure 4:
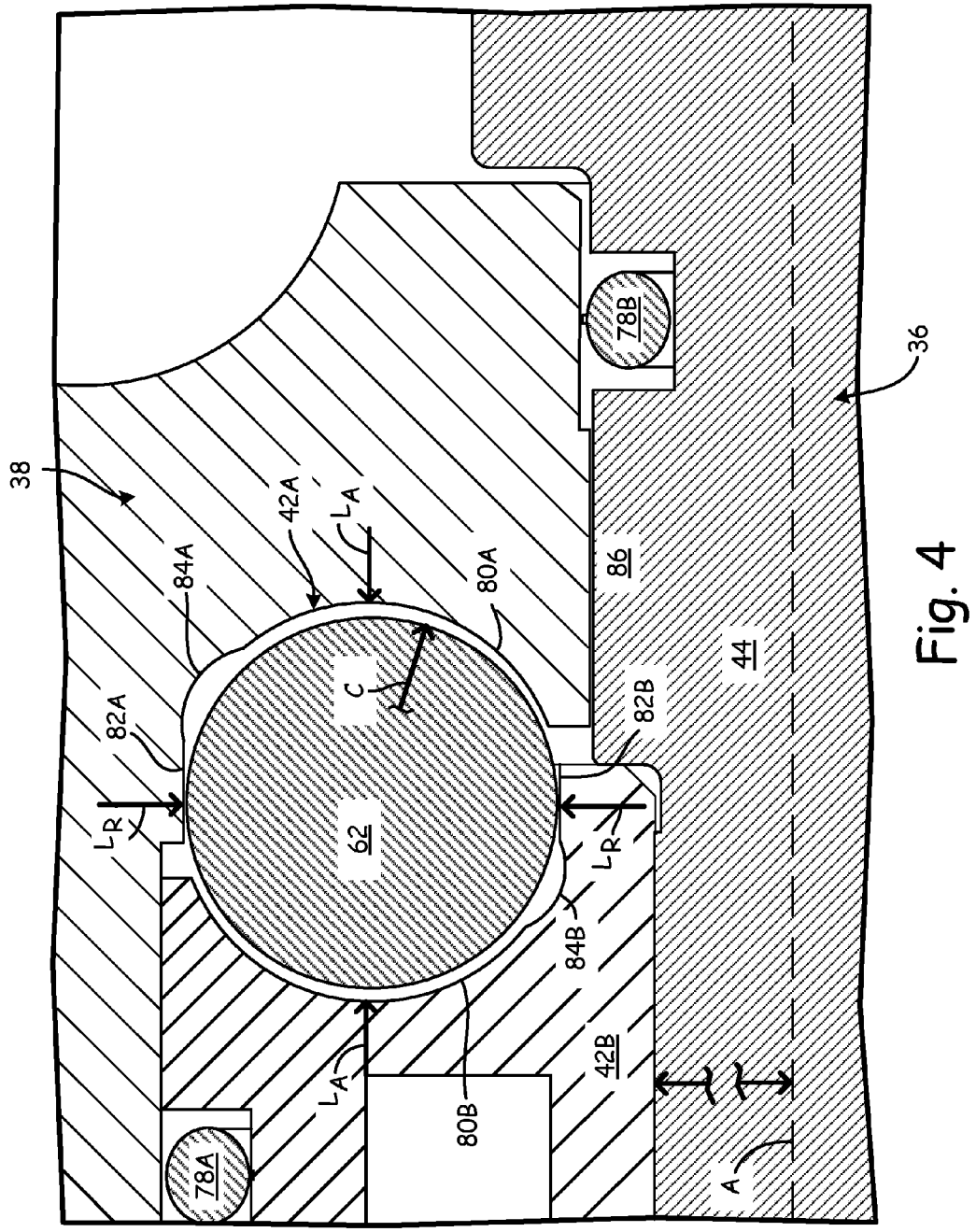
FIG. 4 is a close-up cross-sectional view of a ball bearing positioned between the inner and outer bearing races of FIG. 3.

FIG. 4 is a close-up cross-sectional view of ball bearing 62 positioned between rotating, inner race 42B and stationary, outer race 42A of FIG. 3. Outer race 42A includes axial land 80A and radial land 82A, while inner race 42B includes axial land 80B and radial land 82B. Frusto-conical portion 84A intervenes between axial land 80A and radial land 82A, while frusto-conical portion 84B intervenes between axial land 80B and radial land 82B.

Axial lands 80A and 80B each form arcuate lands that have generally radial extending surfaces that circumscribe axis A. Axial land 80A and axial land 80B have approximately the same radius such that they oppose each other. Axial load $L_A$ is borne by axial lands 80A and 80B, which is ultimately transmitted to fasteners (not shown) that couple flange 52 of inlet housing 32 with retainer 38 (see FIG. 3). Axial lands 80A and 80B have radii of curvature C that is slightly larger than the radius of ball bearing 62, thereby resulting in linear contact between ball bearing 62 and lands 80A and 80B.

Radial lands 82A and 82B each form cylindrical lands that circumscribe axis A. Radial land 82A has a larger radius than radial land 82B, and radial land 82A radially overlaps radial land 82B. Radial load $L_R$ is borne by radial lands 82A and 82B, which is ultimately transmitted to retainer 38 via ball bearings 62. Ball bearings 62 also permit shaft 44 of swivel shaft 36 to rotate within retainer 38 and socket 54 of inlet housing 32. Radial lands 82A and 82B are generally planar, thereby resulting in point contact between ball bearing 62 and lands 82A and 82B. Step 86 on shaft 44 engages with inner race 42B to prevent translation of swivel shaft 36 under force from axial load $L_A$.

Axial load $L_A$ and radial load $L_R$ are not transmitted at the edges of races 42A and 42B, as would occur in a conventional ball bearing arrangement. Axial lands 80A and 80B are positioned in central portions of races 42A and 42B, respectively, away from the edges of the races. Radial lands 82A and 82B are positioned at the edges of races 42A and 42B, respectively, but extend beyond the point of contact with radial load $L_R$ to space the load away from the edge of the race. Radial land 82A forms an extended or extruded portion of race 42A that is tangent to radial load $L_R$. Likewise, radial land 82B forms an extended or extruded portion of race 42B that is tangent to radial load $L_R$.

Lands 80A and 82A are separated by frusto-conical portion 84A, which circumscribe a segment of ball bearing 62 of about fifty degrees or less. Likewise, lands 80B and 82B are separated by frusto-conical portion 84B, which circumscribes a segment of ball bearing 62 of about fifty degrees or less. Portions 84A and 84B are curved such that ball bearing 62 will not ever engage portions 84A and 84B. Frusto-conical portions 84A and 84B, however, provide a gradual blending between axial lands 80A and 80B and radial lands 82A and 82B, respectively, to reduce stress concentrations in races 42A and 42B.

One advantage of swivel 12 is that there are no restrictions in fluid passages 50, 56 and 60, which is at least partially enabled by the load bearing capabilities of races 42A and 42B. The result of this is lower pressure drop through swivel 12, which enables higher flow rates. Other advantages include higher pressure ratings and the ability to carry the pressure load, higher hose reel swivel life due to optimized bearing load transmission, and lower turning torques required for spool 16, which lowers the spring and or motor power required to operate the reel. Swivel 12 provides bearing support for high axial loads induced by high pressures in fluid passage 50 and also radial loads from the weight of spool 16 and hose. The shape of races 42A and 42B minimizes Hertzian contact stress concentrations at the bearing race edges. The entire package of swivel 12 allows for a narrower reel footprint which is a desired customer feature.

Although the present invention has been described with reference to preferred embodiments, workers skilled in the art will recognize that changes may be made in form and detail without departing from the spirit and scope of the invention.

The invention claimed is:

1. A hose reel bearing arrangement that supports a rotatable swivel shaft on a stationary hose reel frame, the bearing arrangement comprising:
   a stationary bearing race anchored to the stationary hose reel frame, and having a stationary arcuate land for bearing an axial load, a stationary cylindrical land for bearing a radial load, and a stationary frustoconical intervening portion;
   a rotating bearing race anchored to the rotatable swivel shaft, and having a rotating arcuate land for bearing the axial load, a rotating cylindrical land for bearing the radial load, and a rotating frustoconical intervening portion; and
   a bearing bracketed axially by the stationary arcuate land and the rotating arcuate land, and radially by the stationary cylindrical land and the rotating cylindrical land.

2. The hose reel bearing arrangement of claim 1, wherein the rotating cylindrical land axially overlaps the stationary cylindrical land.

3. The hose reel bearing arrangement of claim 1, wherein the rotating cylindrical land is situated radially inward of the stationary cylindrical land.

4. The hose reel bearing arrangement of claim 1, wherein the rotating arcuate land and the stationary arcuate land have a shared first radius of curvature, and the bearing has a second radius of curvature less than the first radius of curvature.

5. The hose reel bearing arrangement of claim 1, wherein the stationary and rotating frustoconical intervening portions each surround less than 50° of a circumference of the bearing.

6. The hose reel bearing arrangement of claim 1, wherein the bearing arrangement further comprises lubricant seals disposed to retain lubricant within the bearing arrangement.

7. The hose reel bearing arrangement of claim 1, wherein axial load on the bearing arrangement causes the bearing to make point contact with the rotating and stationary cylindrical lands.

8. The hose reel bearing arrangement of claim 1, wherein axial load on the bearing arrangement causes the bearing to make linear contact with the rotating and stationary arcuate lands.

9. A hose reel inlet swivel attached to a hose reel spool comprises:
   a stationary inlet swivel housing having a first fluid passage disposed to receive fluid from a fluid source;
   a swivel shaft mechanically connected to the hose reel spool, extending at least partially along an axis of rotation, and fluidly sealed to and rotatable with respect to the inlet swivel, the swivel shaft having a second fluid passage fluidly connected to the first fluid passage via a non-constricted aperture;
   a swivel outlet housing extending from the swivel shaft through the hose reel spool, and having a third fluid passage fluidly connected to the second fluid passage via a non-constricted aperture; and
   a bearing arrangement that rotatably supports the swivel shaft, the bearing arrangement comprising:
      a bearing;
      a stationary bearing race having a first arcuate land for axial load, a first cylindrical land for radial load, and a first frustoconical portion;
      a rotating bearing race having a second arcuate land opposite the bearing from the first arcuate land, a second cylindrical land opposite the bearing from the first cylindrical land, and a second frustoconical portion.

10. The hose reel inlet swivel of claim 9, wherein the swivel shaft is fixedly attached to the swivel outlet housing.

11. The hose reel inlet swivel of claim 9, wherein the second arcuate land is situated proximate the stationary inlet swivel and the first arcuate land is situated proximate the swivel outlet housing.

12. The hose reel inlet swivel of claim 9, wherein the stationary bearing race is affixed to a stationary hose reel frame.

13. The hose reel inlet swivel of claim 9, wherein the first fluid passage feeds directly into the second fluid passage.

14. The hose reel inlet swivel of claim 9, wherein the second cylindrical land axially overlaps the first cylindrical land.

15. The hose reel inlet swivel of claim 9, wherein the second cylindrical land is situated radially inward of the first cylindrical land, and the second arcuate land is situated axially closer to the stationary inlet swivel than the first arcuate land.

16. The hose reel inlet swivel of claim 9, wherein the first and second frustoconical portions each surround less than 50° of the circumference of the bearing.

17. A hose reel assembly comprises:
   a hose reel frame;
   an inlet swivel housing anchored to the hose reel spool and having a first fluid passage disposed to receive fluid from a fluid source;
   a swivel shaft fluidly sealed to and rotatable with respect to the inlet swivel, the swivel shaft having a second fluid passage fluidly connected to the first fluid passage via a non-constricted aperture;
   a hose reel spool rotatably supported with respect to the hose reel frame by the swivel shaft;
   a swivel outlet housing extending from the swivel shaft through the hose reel spool to a hose hookup, and having a third fluid passage fluidly connected to the second fluid passage via a non-constricted aperture; and
   a bearing arrangement that rotatably supports the swivel shaft on the hose reel frame, the bearing arrangement comprising:
      a bearing;
      a stationary bearing race having a stationary arcuate land for axial load, a stationary cylindrical land for radial load, and a stationary frustoconical intervening portion;
      a rotating bearing race having a rotating arcuate land opposite the bearing from the stationary arcuate land, a rotating cylindrical land opposite the bearing from the rotating cylindrical land, and a rotating frustoconical intervening portion.

18. The hose reel assembly of claim 17, wherein axial load on the bearing arrangement causes the bearing to make point contact with the rotating and stationary cylindrical lands.

19. The hose reel assembly of claim 17, wherein axial load on the bearing arrangement causes the bearing to make linear contact with the rotating and stationary arcuate lands, but not with the stationary and rotating frustoconical intervening portions.

20. The hose reel assembly of claim 17, wherein the bearing arrangement can bear a radial load of at least 150 lbs (~68 kg), and an axial load of at least 2000 lbs (~90.7 kg).

* * * * *